(12) United States Patent
Hino

(10) Patent No.: US 8,160,985 B2
(45) Date of Patent: Apr. 17, 2012

(54) WEB SERVER SYSTEM

(75) Inventor: Akira Hino, Asaka (JP)

(73) Assignee: Fujifilm Corporation, Tokyo (JP)

( * ) Notice: Subject to any disclaimer, the term of this patent is extended or adjusted under 35 U.S.C. 154(b) by 874 days.

(21) Appl. No.: 12/176,880

(22) Filed: Jul. 21, 2008

(65) Prior Publication Data

US 2009/0043723 A1 Feb. 12, 2009

(30) Foreign Application Priority Data

Aug. 10, 2007 (JP) .................... 2007-208895

(51) Int. Cl.
*G06F 17/00* (2006.01)
(52) U.S. Cl. ......................................... 706/46
(58) Field of Classification Search ...... 706/46
See application file for complete search history.

(56) References Cited

U.S. PATENT DOCUMENTS

| 6,587,880 | B1 | 7/2003 | Saigo et al. | |
|---|---|---|---|---|
| 2003/0028616 | A1* | 2/2003 | Aoki et al. | 709/217 |
| 2004/0049574 | A1* | 3/2004 | Watson et al. | 709/224 |
| 2006/0059133 | A1* | 3/2006 | Moritani | 707/3 |

FOREIGN PATENT DOCUMENTS

| JP | 9-146824 A | 6/1997 |
|---|---|---|
| JP | 11-212912 A | 8/1999 |
| JP | 2005-189942 A | 7/2005 |
| JP | 2005-223811 A | 8/2005 |
| JP | 2007-86932 A | 4/2007 |
| JP | 2007-94729 A | 4/2007 |
| JP | 2007-109137 A | 4/2007 |

OTHER PUBLICATIONS

Fukatani, "Use PHP! 2nd Flight," Web Designing, vol. 4, No. 10, Japan, Oct. 1, 2004, pp. 134-139.
Office Action in Japanese Application No. 2007-208895 mailed Sep. 27, 2011, including an English translation.
Satou, "We Consider Utilization of a Cookie," Open Design, vol. 6, No. 1, Japan, Feb. 1, 1999, pp. 4-45.

* cited by examiner

*Primary Examiner* — Jeffrey A Gaffin
*Assistant Examiner* — Ababacar Seck
(74) *Attorney, Agent, or Firm* — Birch, Stewart, Kolasch & Birch, LLP

(57) ABSTRACT

When a mobile telephone requests a web server for HTML page data containing a link, the server generates an identifier and appends the identifier to the link. An HTML page containing the link with the appended identifier is generated by the server and is transmitted to the telephone. If content of the link is requested by the telephone, then the content is transmitted to the telephone and an access log entry is recorded at the server. The log entry includes the identifier and the content request. If identifiers are found to be in common, the number of times this content was accessed is construed to be a single time. Even if a single item of content is divided into multiple portions and requested multiple times, the number of multiple times is treated as being a single time. The number of times access was performed can be calculated comparatively accurately.

9 Claims, 16 Drawing Sheets

ACCESS LOG CONTAINING IDENTIFIERS

| LINE | ACCESS LOG |
|---|---|
| 1 | yyyy-mm-dd hh:00:10.sss "GET/ContentA?id=123" |
| 2 | yyyy-mm-dd hh:00:20.sss "GET/ContentA?id=456" |
| 3 | yyyy-mm-dd hh:00:30.sss "GET/ContentA?id=789" |
| 4 | yyyy-mm-dd hh:00:40.sss "GET/ContentA?id=456" |
| 5 | yyyy-mm-dd hh:00:50.sss "GET/ContentA?id=123" |

*Fig. 4A*

ACCESS LOG NOT CONTAINING IDENTIFIERS

| LINE | ACCESS LOG |
|---|---|
| 1 | yyyy-mm-dd hh:00:10.sss "GET/ContentA" |
| 2 | yyyy-mm-dd hh:00:20.sss "GET/ContentA" |
| 3 | yyyy-mm-dd hh:00:30.sss "GET/ContentA" |
| 4 | yyyy-mm-dd hh:00:40.sss "GET/ContentA" |
| 5 | yyyy-mm-dd hh:00:50.sss "GET/ContentA" |

*Fig. 4B*

ACCESS-COUNT TABLE (WITH IDENTIFIERS)

*Fig. 7A*

| CONTENT | IDENTIFIER-BY-IDENTIFIER ACCESS COUNT | TOTAL ACCESS COUNT |
|---|---|---|
| ContentA | 2 (id = 123) | 3 |
|  | 2 (id = 456) |  |
|  | 1 (id = 789) |  |
|  |  |  |

ACCESS-COUNT TABLE (WITHOUT IDENTIFIERS)

*Fig. 7B*

| CONTENT | ACCESS COUNT |
|---|---|
| ContentA | 5 |
|  |  |

*Fig. 8*

ACCESS LOG CONTAINING IDENTIFIERS

| LINE | ACCESS LOG |
|---|---|
| 1 | yyyy-mm-dd hh:00:10.sss "GET/ContentA?id=123" |
| 2 | yyyy-mm-dd hh:00:20.sss "GET/ContentA?id=456" |
| 3 | yyyy-mm-dd hh:00:30.sss "GET/ContentA?id=789" |
| 4 | yyyy-mm-dd hh:00:40.sss "GET/ContentA?id=456" |
| 5 | yyyy-mm-dd hh:35:00.sss "GET/ContentA?id=123" |

*Fig. 10*

ACCESS-COUNT TABLE (WITH IDENTIFIERS)

| CONTENT | IDENTIFIER-BY-IDENTIFIER ACCESS COUNT | TOTAL ACCESS COUNT |
|---|---|---|
| ContentA | 2 (id = 123) | 4 |
| | 2 (id = 456) | |
| | 1 (id = 789) | |
| | | |

ACCESS LOG CONTAINING IDENTIFIERS

| LINE | ACCESS LOG |
|---|---|
| 1 | yyyy-mm-dd hh:mm:10.sss "GET/ContentA?id=123000" |
| 2 | yyyy-mm-dd hh:mm:20.sss "GET/ContentA?id=456000" |
| 3 | yyyy-mm-dd hh:mm:30.sss "GET/ContentA?id=789000" |
| 4 | yyyy-mm-dd hh:mm:40.sss "GET/ContentB?id=456001" |
| 5 | yyyy-mm-dd hh:mm:50.sss "GET/ContentB?id=123001" |
| 6 | yyyy-mm-dd hh:mm:55.sss "GET/ContentB?id=123001" |

*Fig. 12A*

ACCESS LOG NOT CONTAINING IDENTIFIERS

| LINE | ACCESS LOG |
|---|---|
| 1 | yyyy-mm-dd hh:mm:10.sss "GET/ContentA" |
| 2 | yyyy-mm-dd hh:mm:20.sss "GET/ContentA" |
| 3 | yyyy-mm-dd hh:mm:30.sss "GET/ContentA" |
| 4 | yyyy-mm-dd hh:mm:40.sss "GET/ContentB" |
| 5 | yyyy-mm-dd hh:mm:50.sss "GET/ContentB" |
| 6 | yyyy-mm-dd hh:mm:55.sss "GET/ContentB" |

*Fig. 12B*

ACCESS-COUNT TABLE (WITH IDENTIFIERS)

*Fig. 14A*

| CONTENT | IDENTIFIER-BY-IDENTIFIER ACCESS COUNT | TOTAL ACCESS COUNT |
|---|---|---|
| ContentA +ContentB | 3 (id = 123000/001) | 3 |
| | 2 (id = 456000/001) | |
| | 1 (id = 789000/001) | |

ACCESS-COUNT TABLE (WITHOUT IDENTIFIERS)

*Fig. 14B*

| CONTENT | ACCESS COUNT |
|---|---|
| ContentA | 3 |
| ContentB | 3 |

*Fig. 15*

EXPIRATION-DATE TABLE

| IDENTIFIER | EXPIRATION DATE |
|---|---|
| 123 | 2007.09.01.00.000 |
| 456 | ..... |
| 789 | ..... |
| | |

# WEB SERVER SYSTEM

BACKGROUND OF THE INVENTION

1. Field of the Invention

This invention relates to a web server system, a server apparatus, a method of controlling the server apparatus and a program for controlling the apparatus.

2. Description of the Related Art

When a client terminal device accesses a server apparatus and requests a desired web page, the number of times the web page has been accessed may be calculated in order to measure the popularity of the web page. There are a number of examples of related art. For instance, in Japanese Patent Application Laid-Open No. 11-212912, communication performed across multiple servers is managed as identical communication; in Japanese Patent Application Laid-Open No. 2005-189942, a cookie is issued for every user who has accessed a server and the cookie is added to an access log; and in Japanese Patent Application Laid-Open No. 2007-94729, it is determined whether access to a website at a link destination is access for which the source of the transition is the website of the link source.

Further, Japanese Patent Application Laid-Open No. 2005-223811 divides a single item of content into multiple items and accesses this content over a plurality of times.

If one item of content is accessed multiple times, it is construed that access is performed multiple times despite the fact that the content is a single item of content. Hence there are occasions where the access count cannot be calculated accurately.

SUMMARY OF THE INVENTION

An object of the present invention is to calculate a comparatively accurate access count.

The present invention provides a web server system comprising a client terminal device and a server apparatus, in which web page request data requesting a web page specified by a URL and having a link to content embedded therein is transmitted from the client terminal device to the server apparatus.

The server apparatus includes: a web page request data receiving device for receiving web page request data that has been transmitted from the client terminal device; an identification data generating device for generating identification data, which identifies the content, based upon the web page request data received by the web page request data receiving device; a web page data generating device for generating web page data, which represents a web page requested by the received web page request data and that contains the identification data generated by the identification data generating device, based upon the web page data received by the web page request data receiving device; and a web page data transmitting device for transmitting the web page data, which has been generated by the web page data generating device, to the client terminal device.

The client terminal device includes: a web page data receiving device for receiving the web page data transmitted from the web page data transmitting device of the server apparatus; and a content request/identification data transmitting device for associating and transmitting content request data, which requests content at a link destination of a link that has been embedded in a web page represented by the web page data received by the web page data receiving device, and identification data contained in the web page data received by the web page data receiving device, to the server apparatus.

The server apparatus further includes: a content request/identification data receiving device for receiving the request data and the identification data associated and transmitted from the content request/identification data transmitting device of the client terminal device; an access log recording device for recording content-specifying data, which specifies content requested by the request data received by the content request/identification data receiving device, and identification data received by the content request/identification data receiving device; and a content transmitting device for transmitting the content, which has been requested by the content request data received by the content request/identification data receiving device, to the client terminal device.

In accordance with the present invention, when web page request data transmitted from a client terminal device is received at a server apparatus, identification data identifying content at a link destination that has been embedded in the web page represented by this web page data is generated. Web page data containing the generated identification data is generated and is transmitted from the server apparatus to the client terminal device.

When web page data is received at the client terminal device, the web page represented by the received web page data is displayed on a display screen of a display unit of the client terminal device. If the link embedded in the displayed web page is clicked, then content request data requesting the content at the link destination and identification data identifying the content are associated with each other and transmitted from the client terminal device to the server apparatus.

When the content request data and identification data are received at the server apparatus, data specifying the requested content and the identification data are recorded and adopted as an access log entry. Further, the content requested is transmitted from the server apparatus to the client terminal device.

In accordance with the present invention, data specifying the requested content and the identification data are recorded and adopted as an access log entry. Since the identification data is generated in response to a request for a web page, it is unique in accordance with the fact that a request for content linked from this web page came after the request for the web page. Items for which the identification data is the same are considered to be requests for a single item of content made over a plurality of times. By counting the number of times content-specifying data for which the identification data is different is recorded, requests for a single item of content made over a plurality of times can be counted as a request made a single time. By counting the number of times content-specifying data for which the identification data is different as the number of accesses, the access count can be calculated comparatively accurately.

The web server system further comprises an access-count deciding device for deciding that the number of times content-specifying data for which identification data is different, from among content-specifying data that recorded by the access log recording device of the server apparatus, has been recorded is the number of times content specified by this content-specifying data was accessed.

The access log recording device of the server apparatus, in addition to recording content-specifying data, which specifies content requested by the request data received by the content request/identification data receiving device, and identification data received by the content request/identification data receiving device, records time of receipt of the request data received by the content request/identification data receiving device, by way of example. Further, the access-count deciding device of the server apparatus decides the number of times the content was accessed, this decision being rendered by regarding items of content-specifying data for which the times of receipt are separated by more than a fixed period of time among items of content-specifying data for which the identification data is the same, as different items of identification data.

For example, in a case where a plurality of links to items of content have been embedded in a web page, the identification data generating device of the server apparatus generates items of identification data, a part of each of which is common to a plurality of items of content, in correspondence with respective ones of the items of content. Further, by way of example, the access-count deciding device decides that the number of times content-specifying data for which identification data is different, from among content-specifying data that has been recorded by the access log recording device of the server apparatus, has been recorded is the number of times content at the link destinations of the plurality of links was accessed, or decides that the number of times identification data having the common part has been recorded is the number of times content at the link destinations of the plurality of links was accessed.

The server apparatus further may further include: an expiration-date data generating device for generating data, which relates to expiration date of identification data, in correspondence with identification data generated by the identification data generating device of the server apparatus; and an expiration-date determination device for determining whether time of receipt of request data and identification data received by the content request/identification data receiving device of the server apparatus falls within an expiration date decided based upon the expiration-date data generated by the expiration-date data generating device in correspondence with the identification data received. In this case, the content transmitting device of the server apparatus would transmit content requested by the content request data received by the content request/identification data receiving device to the client terminal device in response to a determination by the expiration-date determination device that the time of receipt is within the expiration date, and would transmit re-access request data, which requests access to the web page, to the client terminal device in response to a determination by the expiration-date determination device that the time of receipt exceeds the expiration date.

In a case where expiration-date data that should have been generated in correspondence with identification data does not exist among request data and identification data received by the content request/identification data receiving device of the server apparatus, or if such expiration-date data is invalid, then the expiration-date determination device determines that the time of receipt exceeds the expiration date.

The present invention also provides a server apparatus constituting the above-described server system. Specifically, the server apparatus comprises: a web page request data receiving device for receiving web page request data that has been transmitted from a client terminal device, the web page request data requesting a web page specified by an URL and having a link to content embedded therein; an identification data generating device for generating identification data, which identifies the content, based upon receipt of web page request data by the web page request data receiving device; a web page data generating device for generating web page data, which represents a web page requested by the received web page request data and that contains the identification data generated by the identification data generating device, based upon receipt of the web page data received by the web page request data receiving device; a web page data transmitting device for transmitting the web page data, which has been generated by the web page data generating device, to the client terminal device; a content request/identification data receiving device for receiving content request data, which requests content at a link destination of a link that has been embedded in a web page represented by received web page data, and identification data associated with the content request data and contained in the web page data received by the web page data receiving device, the content request data and the identification data being transmitted from the client terminal device in response to receipt at the client terminal device of the web page data transmitted from the web page data transmitting device; an access log recording device for recording content-specifying data, which specifies the content requested by the request data received by the content request/identification data receiving device, and identification data received by the content request/identification data receiving device; and a content transmitting device for transmitting the content, which has been requested by the content request data received by the content request/identification data receiving device, to the client terminal device.

The present invention also provides an operation control method suited to the above-described server apparatus. Specifically, the present invention provides a method of controlling operation of a server apparatus, comprising: a step of a web page request data receiving device receiving web page request data that has been transmitted from a client terminal device, the web page request data requesting a web page specified by an URL and having a link to content embedded therein; a step of an identification data generating device generating identification data, which identifies the content, based upon receipt of web page request data by the web page request data receiving device; a step of a web page data generating device generating web page data, which represents a web page requested by the received web page request data and that contains the identification data generated by the identification data generating device, based upon receipt of the web page data received by the web page request data receiving device; a step of a web page data transmitting device transmitting the web page data, which has been generated by the web page data generating device, to the client terminal device; a step of a content request/identification data receiving device receiving content request data, which requests content at a link destination of a link that has been embedded in a web page represented by received web page data, and identification data associated with the content request data and contained in the web page data received by the web page data receiving device, the content request data and the identification data being transmitted from the client terminal device in response to receipt at the client terminal device of the web page data transmitted from web page data transmitting device; a step of an access log recording device recording content-specifying data, which specifies content requested by the request data received by the content request/identification data receiving device, and identification data received by the content request/identification data receiving device; and a step of a content transmitting device transmitting the content, which has been requested by the content request data received by the content request/identification data receiving device, to the client terminal device.

The present invention further provides a program for implementing the above-described method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4A and 4B illustrate examples of access logs;

FIGS. 7A and 7B illustrate examples of access-count tables;

FIG. 8 illustrates an example of an access log;

FIG. 10 illustrate an example of an access-count table;

FIGS. 12A and 12B illustrate examples of access logs;

FIGS. 14A and 14B illustrate examples of access-count tables;

FIG. 15 illustrates an example of an expiration-date table; and

DESCRIPTION OF THE PREFERRED EMBODIMENT

A preferred embodiment of the present invention will now be described in detail with reference to the drawings.

Figure 1:
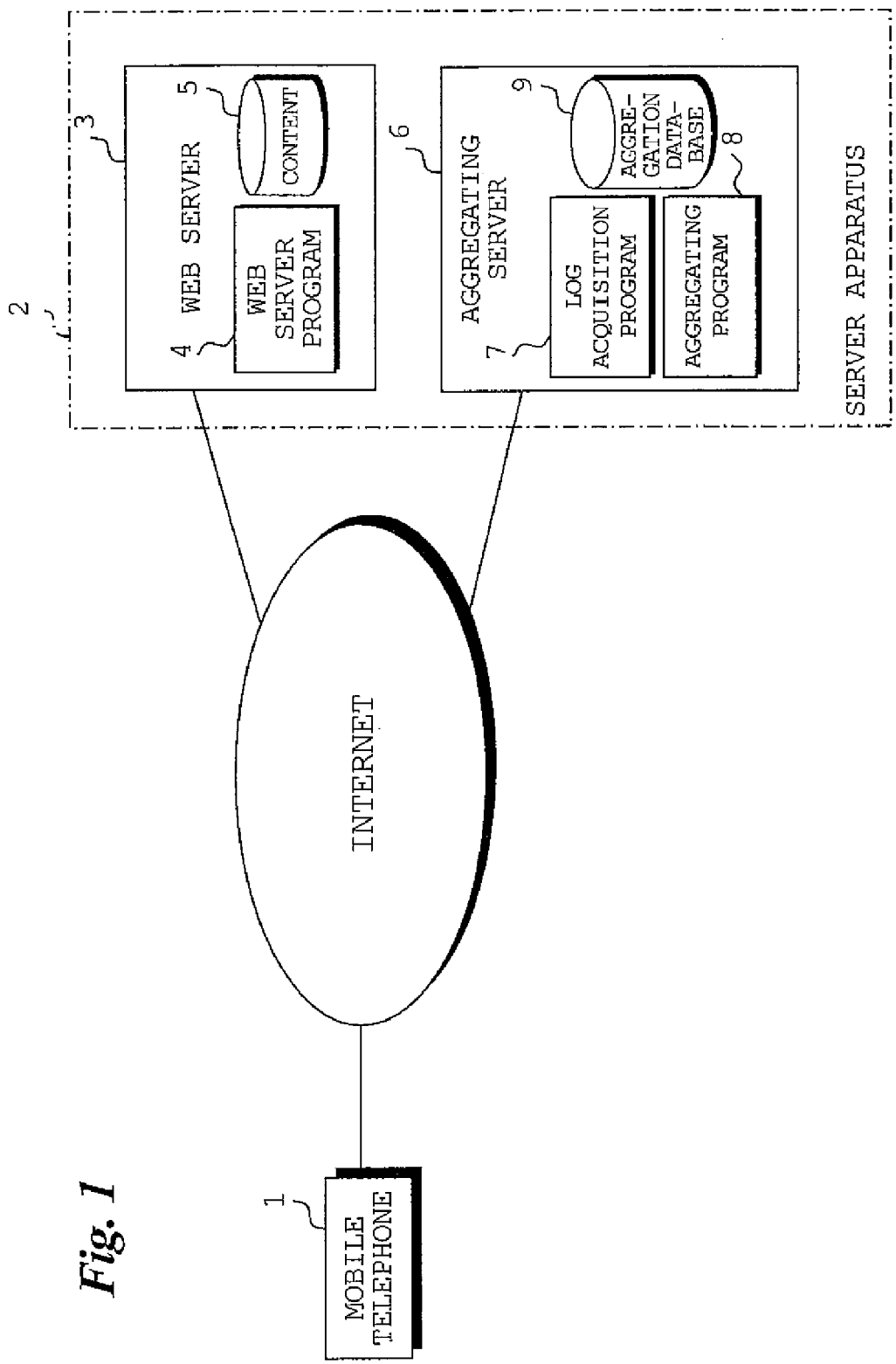
FIG. 1 illustrates an overview of a communication system.

FIG. 1 illustrates an overview of a web server system according to an embodiment of the present invention.

The web server system includes a mobile telephone (client terminal device) 1 and a server apparatus 2 capable of communicating with each other via the Internet. The terminal device is not limited to the mobile telephone 1; another terminal device inclusive of a personal computer can be utilized as a terminal device.

The mobile telephone 1 includes a display unit and a communication unit (neither of which are shown) in addition to a call function. In response to the server apparatus 2 being accessed by the mobile telephone 1, image data representing an HTML (Hypertext Markup Language) page transmitted from the server apparatus 2 is received by a communication device (web page data receiving device) so that the HTML page can be displayed on the display screen of the display unit. In a case where a link to content has been embedded in the displayed HTML page, data requesting this content is transmitted from the mobile telephone 1 to the server apparatus 2 using a communication device (content request/identification data transmitting device).

The server apparatus 2 includes a web server 3 and an aggregating server 6. The web server 3 and aggregating server 6 include a CPU, a memory, a communication device for connecting to the Internet, a hard-disk drive and a timekeeper for measuring time. None of these are shown.

Installed in the web server 3 is a web server program 4 for performing an operation described below. The web server 3 also includes a content database 5 in which content (moving pictures, still images, music and an HTML or other web pages) has been stored. The content database 5 is capable of being accessed by the hard-disk drive.

Installed in the aggregating server 6 are a log acquisition program 7 for acquiring an access log, described later, and an aggregating program 8 for aggregating the access log acquired. The log acquisition program 7 and aggregating program 8 may be a common program rather than separate programs. The aggregating server 6 includes an aggregation database 9 accessible by the hard-disk drive.

In this embodiment, the web server 3 and aggregating server 6 are separate servers but they may be a common server. A plurality of web servers 3 may be used. One aggregating server 6 is preferable.

The web server system according to this embodiment is such that if a request is issued multiple times in such a manner that content at the link destination of a link that has been embedded in an HTML page is transmitted by being divided in a plurality of transmissions (for instance, HTTP Range request), then the number of times access has been performed is treated as a single time and not multiple times. Since the number of accesses is treated as a single access in accordance with a request for one item of content, the number of times this content is accessed can be calculated comparatively accurately.

Figure 2:
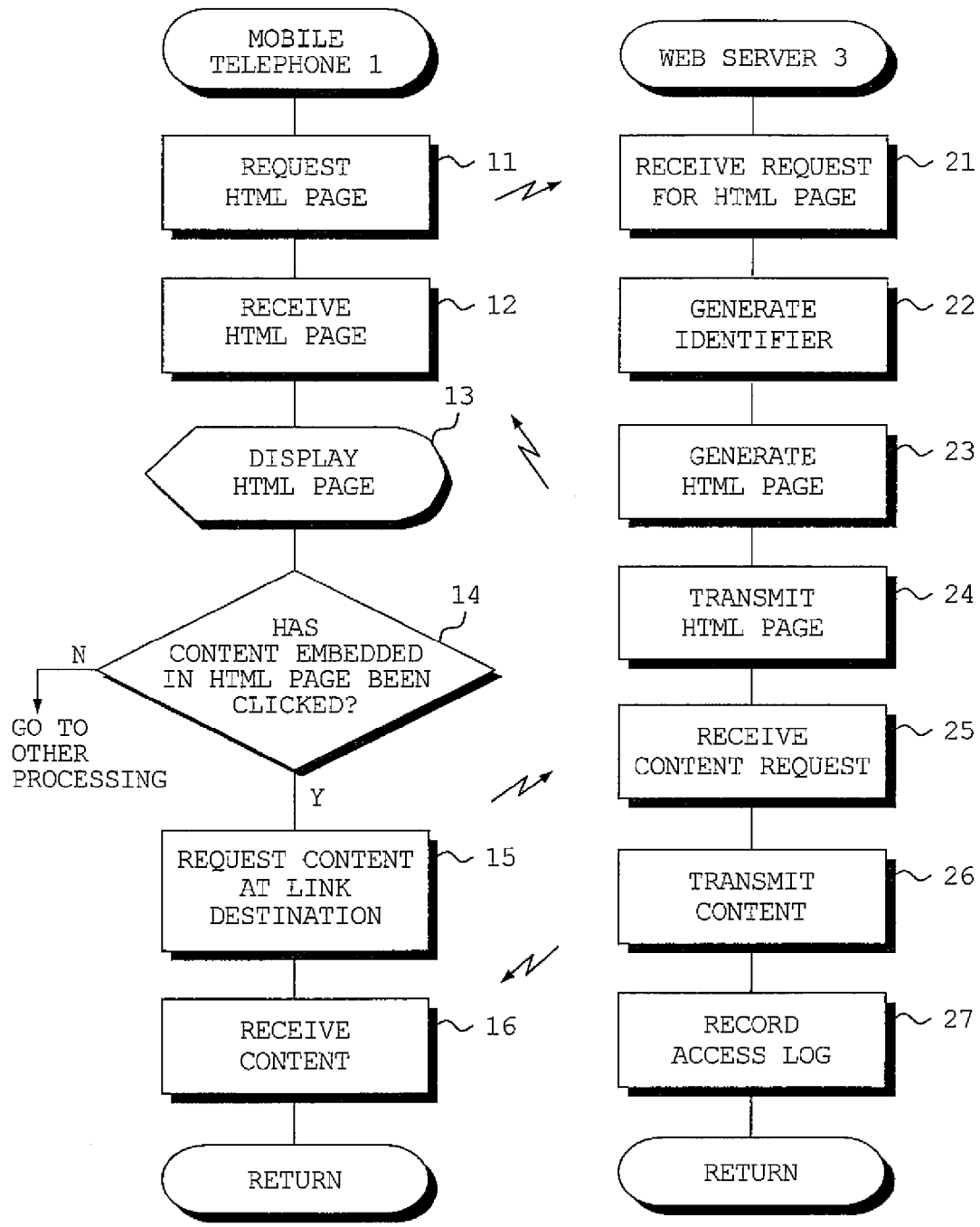
FIG. 2 illustrates processing executed by a mobile telephone and by a web server.

FIG. 2 is a flowchart illustrating processing executed by the mobile telephone 1 and by the web server 3.

Request data (web page request data) requesting an HTML page in which a link destination for content has been embedded is transmitted from the mobile telephone 1 to the web server 3 (step 11). The request data also contains the URL name (e.g., http://X.Y.Z/html) of the HTML page requested.

Upon receiving the request data transmitted from the mobile telephone 1 (step 21), the web server 3 generates an identifier (identification data) (step 22). The identifier may be generated using a random number or may simply be a string of numerals of prescribed digits, a character string or a combination of these strings. Naturally, identifiers generated in advance may selected successively in accordance with issued requests, or information relating to access time may be used. Even in a case where there are a plurality of the web servers 3, it is unnecessary to share identifiers. Further, in response to the request for the HTML page (web page), HTML page data representing the HTML page conforming to this request is generated (step 23). A link indicating the link destination of content has been embedded in the HTML page generated, and the generated identifier has been appended to this link. It may of course be so arranged that the identifier is not appended to the link but is described in the HTML page data using a form tag. The generated HTML page data is transmitted from the web server 3 to the mobile telephone 1 (step 24).

When the HTML page data that has been transmitted from the web server 3 is received by the mobile telephone 1 (step 12), the HTML page represented by the received HTML page data is displayed on the display screen of the display unit of mobile telephone 1 (step 13).

Figure 3:
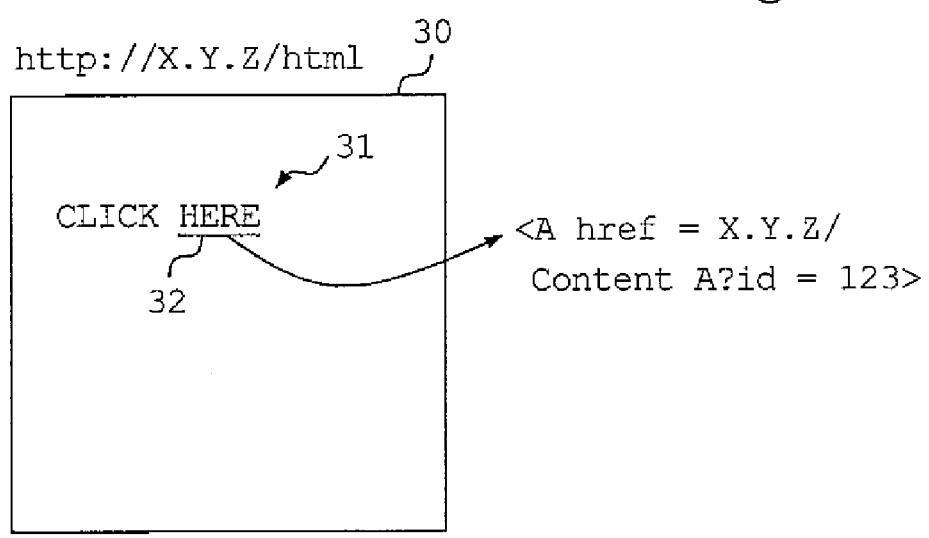
FIG. 3 illustrates an example of an HTML page.

FIG. 3 illustrates an example of an HTML page 30 displayed on the display screen of the display unit of mobile telephone 1.

The URL (Uniform Resource Locator) of the HTML page 30 is http://X.Y.Z/html, as mentioned above, and it is assumed here that the HTML page 30 having this URL has been requested of the web server 3 by the mobile telephone 1.

The HTML page 30 contains text 31 reading "CLICK HERE". The character string "HERE" in this text is clickable hot text 32. A link (A href=X.Y.Z/ContentA?id=123) to content called "ContentA" has been embedded in the hot text 32. X.Y.Z/ContentA indicates the URL of the content called "ContentA", and id=123 indicates the generated identifier. In this embodiment, the link that has been embedded in the HTML page is composed of the URL and identifier of the content at the link destination. HTML page data in which a link has thus been embedded is transmitted from the web server 3 to the mobile telephone 1.

With reference again to FIG. 2, if the hot text 32 is clicked ("YES" at step 14), then request data requesting the content at the link destination is transmitted from the mobile telephone 1 to the web server 3 (step 15). This request data contains the (link A href=X.Y.Z/ContentA?id=123) of the above-mentioned content. (This is an HTTP GET method.) Since the link includes the identifier, the content request data and the identifier are associated with each other and transmitted from the mobile telephone 1 to the web server 3. In a case where the mobile telephone 1 requests that one item of content be transmitted upon being divided into a plurality of portions, request data requesting the content at the link destination is transmitted from the mobile telephone 1 to the web server 3 a plurality of times. Irrespective of the fact that one item of content has been requested of the web server 3, the web server 3 deems that the request has been made a plurality of times.

When the request data transmitted from the mobile telephone 1 is received at the web server 3 (step 25), the requested content is read from the content database 5. The read content is transmitted from the web server 3 to the mobile telephone 1 (step 26). In a case where the mobile telephone 1 requests that one item of content be transmitted upon being divided into a plurality of portions, as mentioned above, the content divided into a plurality of portions is transmitted from the web server 3 to the mobile telephone 1 successively over a plurality of times. Furthermore, an access log entry is recorded at the web server 3 (step 27). The access log entry may be recorded in the content database 5 or may be recorded in another memory.

FIGS. 4A and 4B illustrate examples of access logs. Line numbers have been included in order to facilitate comprehension. FIG. 4A illustrates an access log in which identifiers have been included in the manner set forth above. In order to facilitate comprehension, FIG. 4B illustrates an access log in which the identifiers have not been included.

As shown in FIG. 4A, recorded as a single series in the access log containing the identifiers are access times (times at which content was transmitted, namely yyyy-mm-dd-hh:mm:10.sss, etc.) and portions (content name: content-specifying data and identifier, namely GET/ContentA?id=123, etc.) of links to content that has been requested by the GET method (although the GET method need not necessarily be employed).

The identifier on the first line of the access log entry and the identifier on the fifth line of the access log entry are common (id=123) to both lines. Therefore, it is considered that a certain mobile telephone requested the single item of content named "Content A" two times and acquired the content named "Content A", which had been divided into two portions. Similarly, the identifier on the second line of the access log entry and the identifier on the fourth line of the access log entry are common (id=456) to both. Therefore, it is considered that another mobile telephone requested the single item of content named "Content A" two times and acquired the content named "Content A", which had been divided into two portions. The identifier on the third line is not included in any of the other access log entries, and therefore it is considered that the content named "Content A" was requested one time and that the content named "Content A", which had not been divided, was acquired. Thus the content named "content A" was requested five times. However, if requests for divided transmission are dealt with as a single request, then this means that the content named "content A" was requested three times. Thus, since the access log contains identifiers, the real number of times the content was accessed can be determined.

As shown in FIG. 4B, recorded as a single series in the access log not containing identifiers are access times and content names (GET/ContentA) requested by the GET method. Since this access log does not contain identifiers, all that can be determined is merely that the content was accessed five times.

Figure 5:
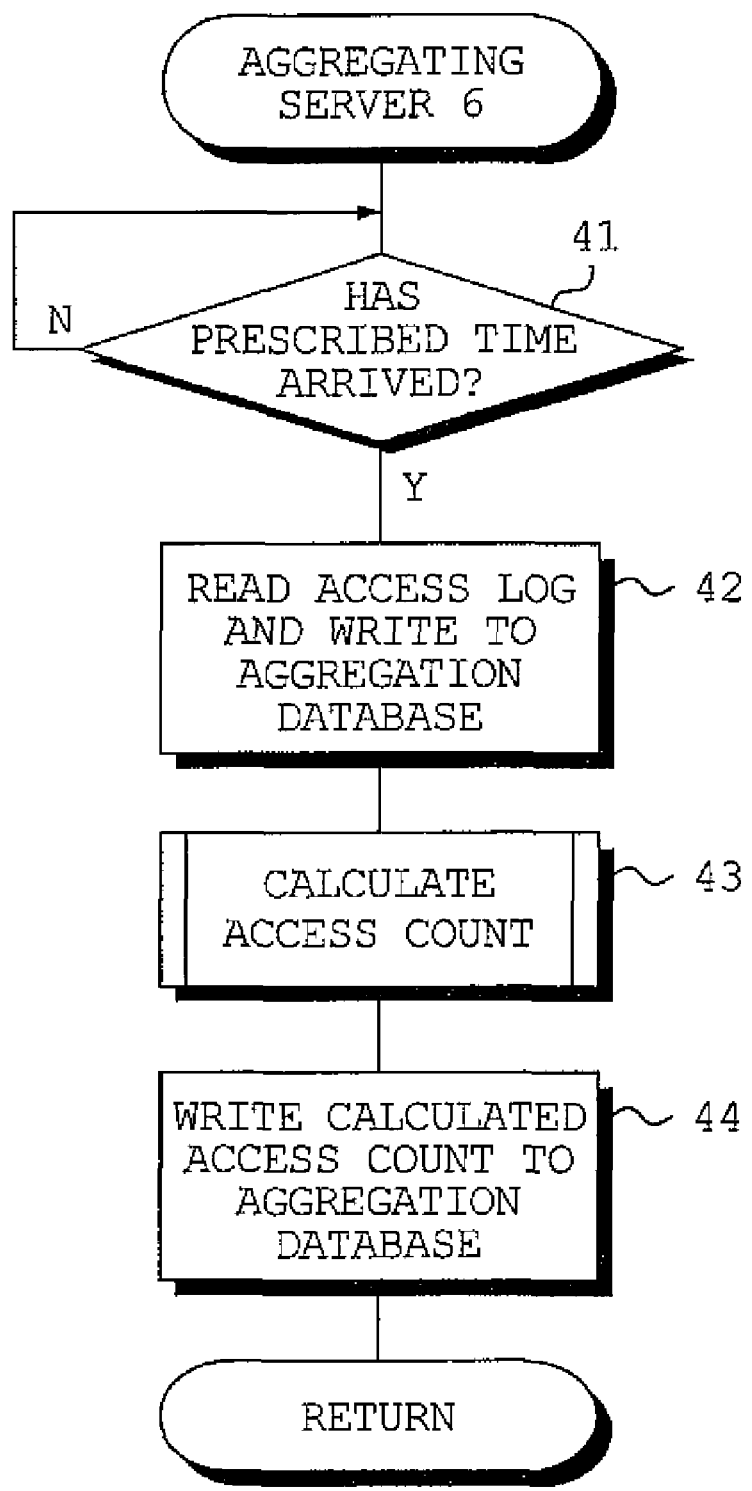
FIG. 5 is a flowchart illustrating processing executed by an aggregating server.

FIG. 5 is a flowchart illustrating processing executed by the aggregating server 6.

When a prescribed time arrives ("YES" at step 41), the aggregating server 6 accesses the web server 3. The aggregating server 6 reads the access log that has been recorded in the web server 3 and records the read access log in the aggregation database 9 (step 42). The number of times access was performed per item of content is calculated (step 43) and the calculated access count is written to the aggregation database 9 (step 44).

Figure 6:
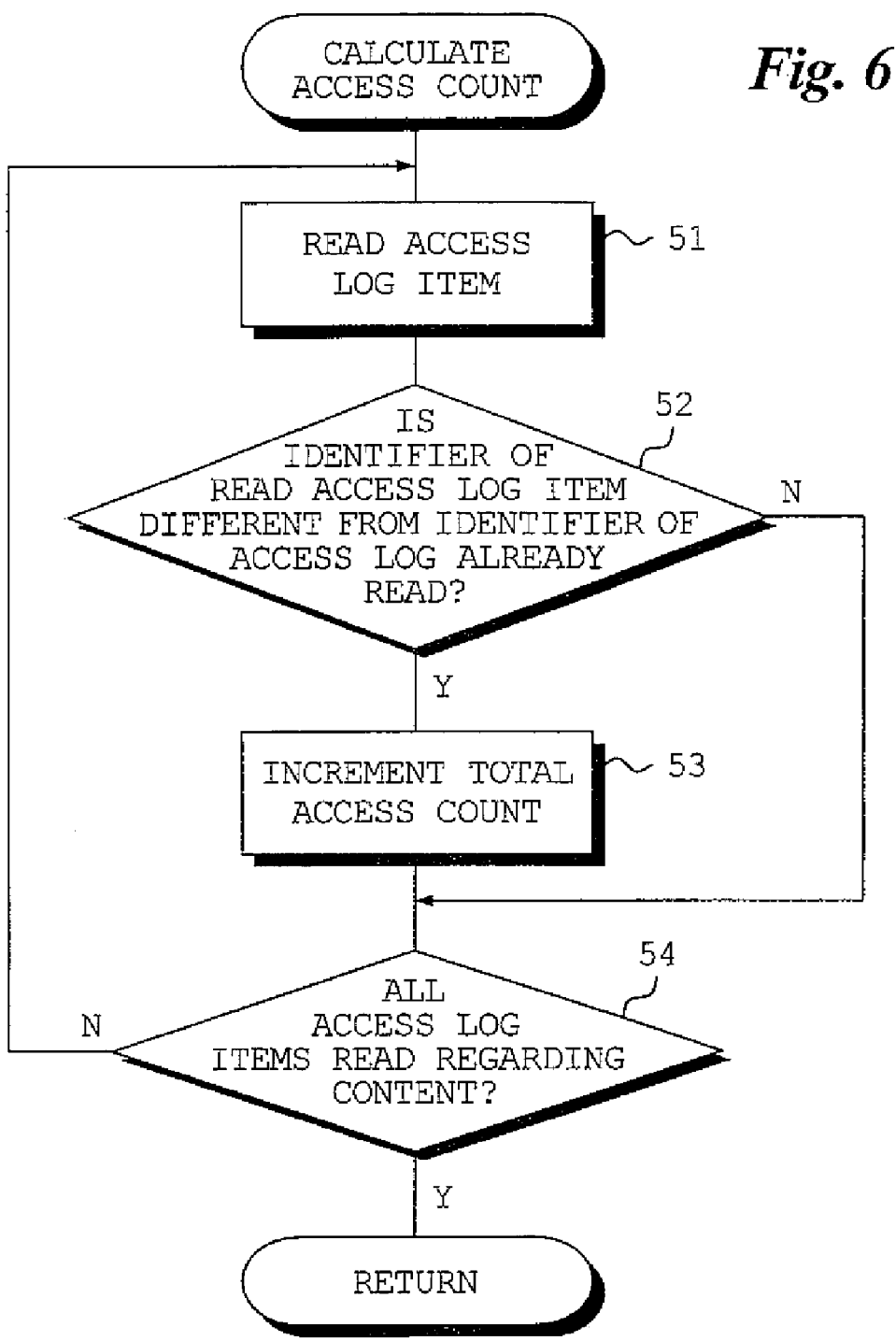
FIG. 6 is a flowchart illustrating processing for calculating number of times access has been performed.

FIG. 6 is a flowchart illustrating processing (step 43 in FIG. 5) for calculating the number of times access was performed. The number of times a prescribed item of content was accessed is calculated among the access log entries recorded in the aggregation database 9. It goes without saying that the access log entries used are those that include the identifiers, as illustrated in FIG. 4A.

The access log entry on the first line among the access log entries is read (step 51). It is determined whether the identifier included in the read access log entry is different from the identifier of an access log entry that has already been read (step 52). In a case where the access log entry on the first line is read, an access log entry read earlier does not exist and therefore a decision is rendered that the identifier is different ("YES" at step 52). In such case the total access count is incremented (step 53). The processing of steps 51 to 53 is repeated until all access log entries regarding the content for which the access count is to be calculated have been read (step 54).

If the identifier of the read access log entry is the same as the identifier of an already read access log entry ("NO" at step 52), then this is treated as a situation in which a single item of content has been requested with division into a plurality of portions. In a case where a single item of content has been requested a plurality of times with division into a plurality of portions, the processing of step 53, which increments the total access count, is skipped in order to render such a request a single-time request.

FIGS. 7A and 7B illustrate examples of access-count tables indicating calculated access counts. FIG. 7A illustrates a case where links include identifiers, as described above. In order to facilitate comprehension, FIG. 7B illustrates a case where no identifier is included.

If recorded access log entries are categorized according to access log entries having different identifiers, as shown in FIG. 7A, then, for the content named "Content A", identifier id=123 appears two times, identifier id=456 appears two times and identifier id=789 appears one time. When the access count is calculated, the total access count is not incremented with regard to an identifier that is the same, and therefore it will be understood that the total access count is three. Even in a case where a plurality of requests have been issued in such a manner that a single item of content is divided into a plurality of portions and transmitted, this can be handled as access performed a single time and the number of times access has been performed can be calculated comparatively accurately.

In the case where an access log entry does not include an identifier, as illustrated in FIG. 7B, the number of times the content named "Content A" was accessed becomes five.

Figure 9:
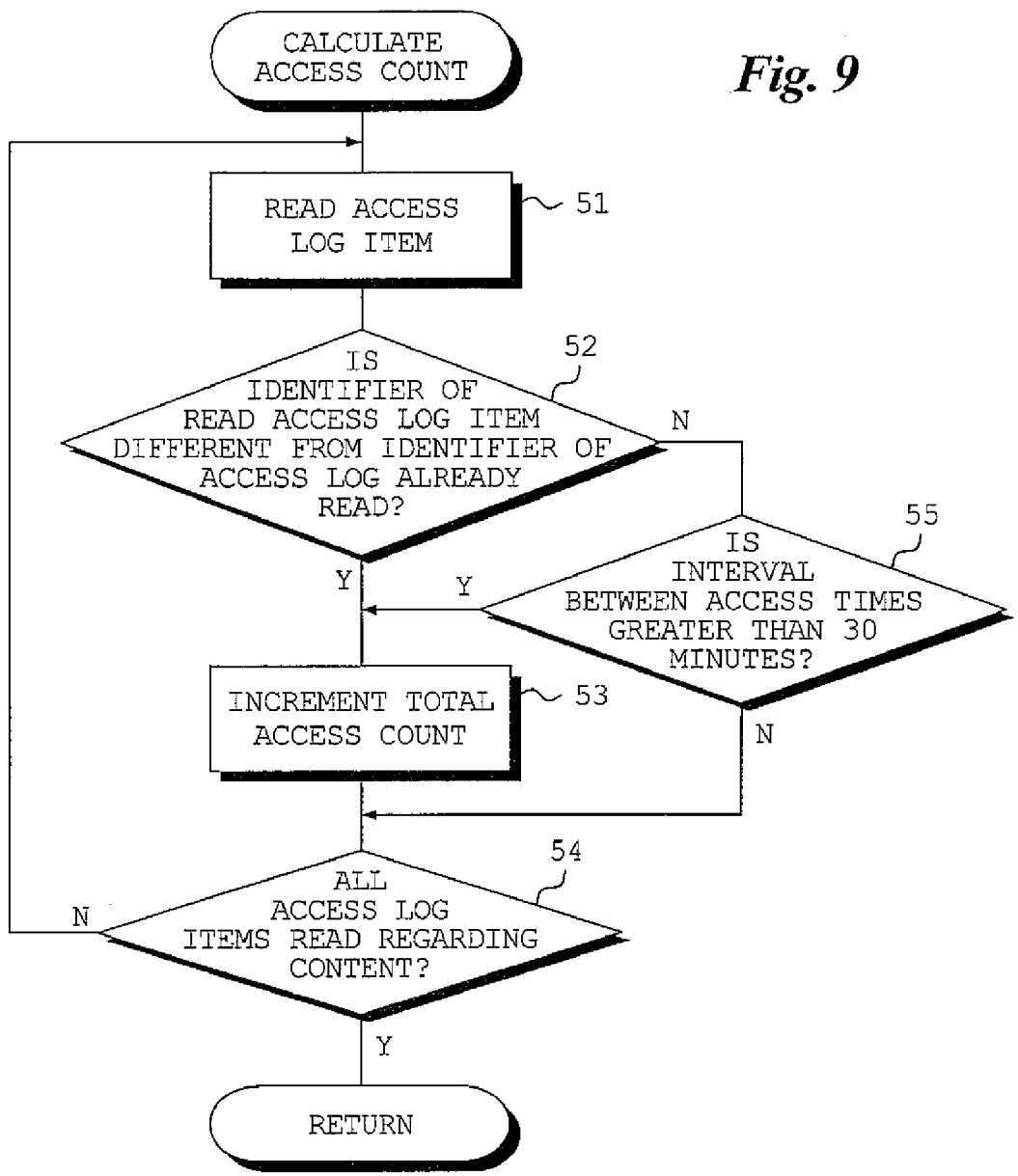
FIG. 9 is a flowchart illustrating processing for calculating number of times access has been performed.

FIGS. 8 to 10 illustrate a modification. In the embodiment described above, no consideration is given to recording times in an access log. This modification takes access-log recording times into consideration.

FIG. 8 illustrates an example of an access log containing identifiers.

Although the identifier included in the access log entry on the first line and the identifier included in the access log entry on the fifth line are the same, more that 30 minutes elapsed from the access time ascertained from the access log entry on the first line until the access time ascertained from the access log entry on the fifth line. Therefore, even though the identifiers are the same, it can be construed that the content was requested from different mobile telephones. In this modification, if, in a case where there are multiple access log entries having the same identifier, the interval between access times is greater than 30 minutes, then the access count is incremented upon regarding the request as being one that was not a request for transmission of content by division of the content into a plurality of portions.

FIG. 9 is a flowchart illustrating processing for calculating number of times access has been performed. This corresponds to the processing shown in FIG. 6. Processing steps in FIG. 9 identical with those shown in FIG. 6 are designated by like step numbers and need not be described again.

If the identifier of the read access log entry is the same as the identifier of an already read access log entry ("NO" at step 52), as mentioned above, then it is determined whether the interval between the access times ascertained from these access log entries having identical identifiers is greater than 30 minutes (step 55). If the interval between the access times is greater than 30 minutes ("YES" at step 55), then it is construed that these are not access log entries recorded as a result of requests made multiple times in order to transmit one item of content upon dividing it into a plurality portions, as set forth above. The total access count is incremented in order to count the requests as individual access events (step 53). If the interval between the access times is not greater than 30 minutes ("NO" at step 55), then it is construed that these access log entries are access log entries recorded as a result of requests made multiple times in order to transmit one item of content upon dividing it into a plurality portions. The processing of step 53, which is for incrementing the total access count, is skipped in order to count accurately the number of times one item of content was accessed.

FIG. 10 illustrates an access-count table. This corresponds to FIG. 7A.

In the case of the access log shown in FIG. 8, the total access count is three, as indicated in FIG. 7A, when access times are not taken into account. By contrast, when access times are considered, it is construed that the access log entries on the first and fifth lines shown in FIG. 8 are the result of separate access events. Accordingly, the total access count becomes four. Thus, a more accurate total access count can be calculated.

FIGS. 11 to 14 illustrate another modification. In this modification, total access count is calculated by regarding multiple items of content at the link destinations of a plurality of links that have been embedded in the same page as the same content.

Figure 11:
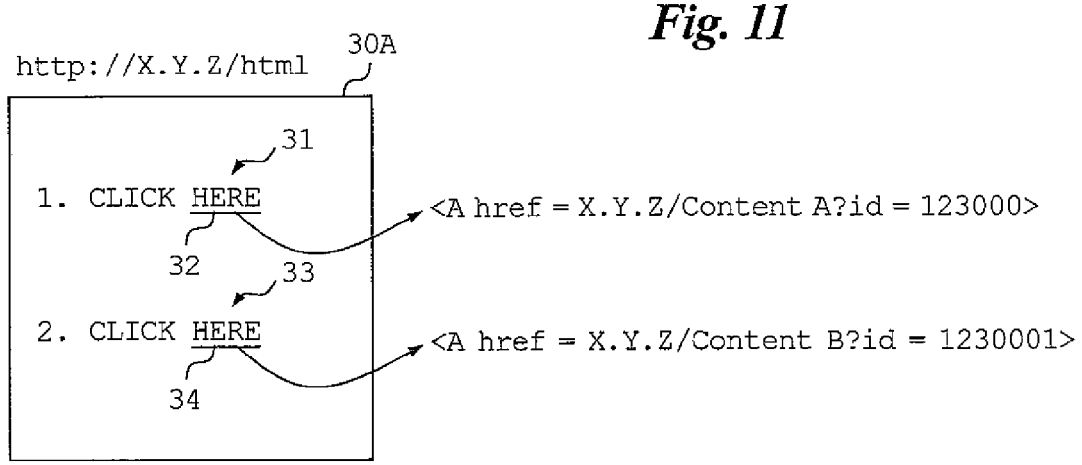
FIG. 11 illustrates an example of an HTML page.

FIG. 11 illustrates an example of an HTML page 30A represented by HTML page data that is transmitted from the web server 3 in response to a request from the mobile telephone 1 in the manner described earlier.

The HTML page 30A contains first text 31 and second text 33 reading "CLICK HERE". The character string "HERE" in the first text 31 is clickable hot text 32 where a link (A href=X.Y.Z/ContentA?id=123000) has been embedded. The character string "HERE" in the second text 33 is clickable hot text 34 where a link (A href=X.Y.Z/ContentA?id=123001) has been embedded. The three higher-order digits (numerals 123) of the identifiers included in the links embedded in the HTML page are common to both identifiers in the case of the same page. The three lower-order digits (numerals 000 or 001) are made different in order to distinguish content link by link. Thus, identifiers are generated in such a manner that the three higher-order digits of the identifiers will be common to the identifiers in the case of the same page and such that the three lower-order digits of the identifiers will be different for content that is different. It goes without saying that identifiers are not limited to numerals of six digits, and it will suffice if it is possible to identify whether pages are the same page and whether items of content are different on a per-content basis.

When the HTML page 30A shown in FIG. 11 is displayed on the display screen of mobile telephone 1, hot text 32, 34, etc., is clicked. When the hot text 32 is clicked, a request for the content named "Content A" is transmitted to the web server 3. When the hot text 34 is clicked, a request for the content named "Content B" is transmitted to the web server 3. When this occurs, the data representing the requested items of content and the identifiers are recorded in the web server 3 as access log entries.

FIGS. 12A and 12B illustrate examples of access logs. FIG. 12A illustrates an access log in which identifiers have been included. In order to facilitate comprehension, FIG. 12B illustrates an access log in which the identifiers have not been included.

As shown in FIG. 12A, the first to third lines all indicate that the content named "Content A" was requested; the three lower-order digits of the identifiers are all 000. The three higher-order digits of the identifiers are all different and hence it can be determined that there was no request for dividing content into a plurality of portions. The fourth to sixth lines all indicate that the content named "Content B" was requested; the three lower-order digits of the identifiers are all 001. In this case also the three higher-order digits of the identifiers are all different and hence it can be determined that there was no request for dividing content into a plurality of portions. By referring to the three higher-order digits of an identifier, it can be determined whether or not there was a request to divide content into a plurality of portions, and by referring to the three lower-order digits, it can be determined whether or not there was a request for different content on the same page.

In a case where the access log does not contain identifiers, as shown in FIG. 12B, what content was requested is all that can be determined.

Figure 13:
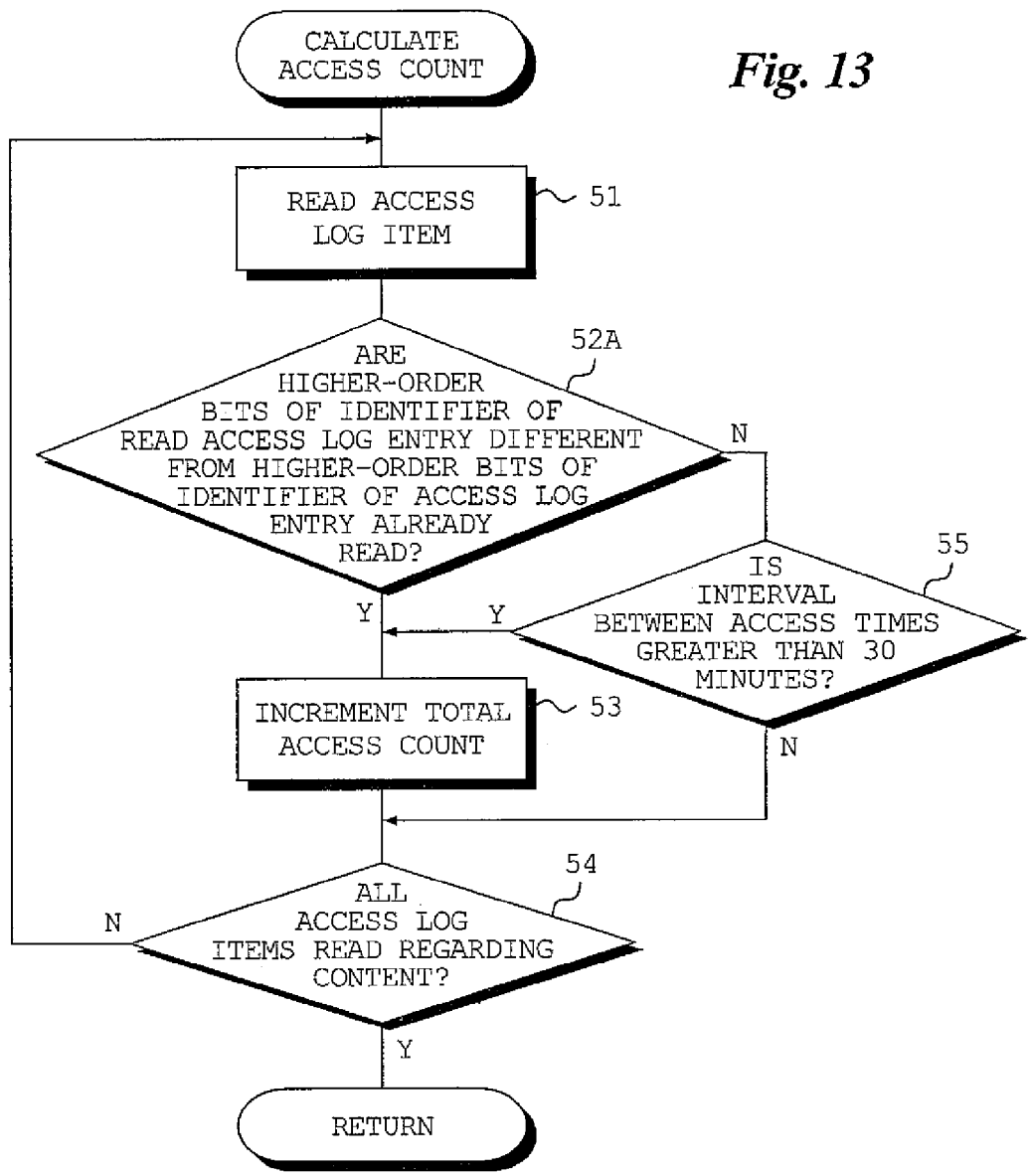
FIG. 13 is a flowchart illustrating processing for calculating number of times access has been performed.

FIG. 13 is a flowchart illustrating processing for calculating number of times access has been performed. Processing steps in FIG. 13 identical with those shown in FIG. 6 or FIG. 9 are designated by like step numbers and need not be described again.

When the access log is read (step 51), as mentioned above, it is determined whether the three higher-order digits of the identifier of the read access log entry are different from the three higher-order digits of the identifier of an access log entry that has already been read. If they are different ("YES" at step 52A), the total access count is incremented (step 53). Thus the number of times content linked from the same page has been accessed can be calculated comparatively accurately. Naturally, since the three lower-order digits of the identifier differ from one item of content to another, the access count for every item of content can also be calculated by checking for a non-match of the three lower-order digits between identifiers.

FIGS. 14A and 14B illustrate examples of access-count tables. FIG. 14A illustrates an access-count table obtained from the access log shown in FIG. 12A, and FIG. 14B illustrates an access-count table obtained from the access log shown in FIG. 12B.

With reference to FIG. 14A, in a case where identifiers are considered to be the same if the three higher-order digits of the identifiers are the same, even though the three-lower order digits of the identifiers are different, the number of times content named "Content A" or "Content B" identified on a per-identifier basis was accessed is three times with regard to content specified by identifier id=123000 or 123001; two times with regard to content specified by identifier id=456000 or 456001; and one time with regard to content specified by identifier id=789000 or 789001. The total access count appears as the number of identifiers for which the three higher-order digits are different between identifiers, and therefore the count is three. The total access count for access to the content named "Content A" or "Content B" is three. In a case where one moving picture is composed of "Content A" and "Content B", for example, the total access count for this moving picture can be determined, and therefore this modification is effective in such cases.

All that can be determined from the access log shown in FIG. 12B is merely that "Content A" and "Content B" were each accessed three times.

Figure 16:
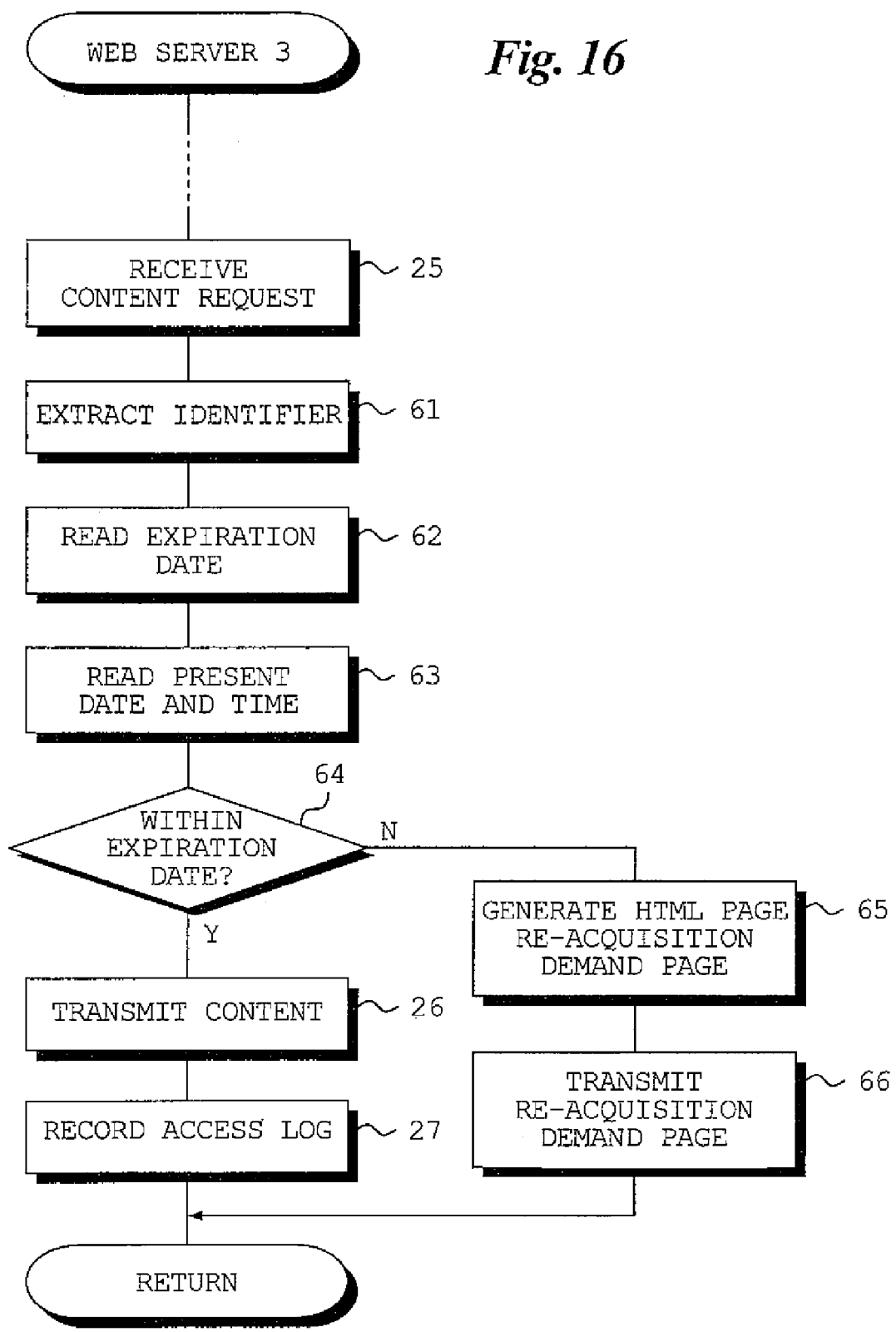
FIG. 16 illustrates an example of processing executed by a web server.

FIGS. 15 and 16 illustrate a further modification. This modification furnishes a content identifier with an expiration-date function. If an identifier contained in a content request is extracted and the extracted identifier falls within the expiration date, then the content is transmitted in the manner described above. If the extracted identifier does not fall within the expiration date, then the mobile telephone is required to redo the request for the HTML page having the link source of the content.

FIG. 15 illustrates an example of an expiration-date table.

This expiration-date table contains the expiration date of an identifier and is recorded in the web server 3. When the identifier is generated, so is the expiration date. The expiration date is recorded in association with the generated identifier.

FIG. 16 illustrates processing executed by the web server 3. This processing corresponds to the processing executed by the web server 3 in FIG. 2.

When content request data transmitted from a mobile telephone is received at the web server 3 (step 25), the identifier contained in the received request data is extracted (step 61). The expiration date is read from the extracted identifier by referring to the expiration-date table (step 62). The present date and time also is read (step 63).

If the present date and time falls within expiration date ("YES" at step 64), the content is transmitted from the web server 3 to the mobile telephone 1 in response to a request (step 26) and the access log entry is recorded (step 27). If the present date and time does fall within the expiration date ("NO" at step 64), then data representing an HTML page re-acquisition demand page, which requires that access be performed from the HTML page having the link source, is generated (step 65). The generated re-acquisition demand page data is transmitted from the web server 3 to the mobile telephone 1 (step 66). The mobile telephone 1 accesses the HTML page having the content link source and requests the content.

If content that has been requested before can be requested directly, the identifier will be the same. Therefore, in a case where the time interval between access times is not taken into account, the total access count will not be incremented and, hence, there may be occasions where an accurate total access count cannot be calculated. If the expiration date is exceeded, content that has been requested before can no longer be requested directly. Accordingly, an identifier is appended anew and the total access count is incremented. Thus the total access count can be calculated comparatively accurately.

In the foregoing embodiment, if, for some reason such as the fact that an expiration date cannot be read, the expiration-date data is considered not to exist or is considered to be invalid (for example, even though an expiration date has been read, the read expiration date indicates an expiration that is inconceivable), then a determination would be made that the present date and time exceeds the expiration date and the re-acquisition demand page data would be transmitted from the web server 3 to the mobile telephone 1.

In the foregoing embodiment, an expiration-date table is generated. However, in a case where an identifier per se possesses expiration-date information (e.g., information representing the time at which the identifier was generated), whether the present date and time falls within the expiration date can be determined using this expiration-date information even without an expiration-date table. For example, in a case where content is requested within a fixed period of time from the time at which an identifier was generated, this request would be treated as being valid.

As many apparently widely different embodiments of the present invention can be made without departing from the spirit and scope thereof, it is to be understood that the invention is not limited to the specific embodiments thereof except as defined in the appended claims.

What is claimed is:

1. A web server system comprising a client terminal device and a server apparatus, in which web page request data requesting a web page specified by a URL and having a link to content embedded therein is transmitted from said client terminal device to said server apparatus;

wherein said server apparatus includes:
a web page request data receiving device for receiving the web page request data that has been transmitted from said client terminal device;
an identification data generating device for generating identification data, which identifies the content, based upon the web page request data received by said web page request data receiving device;
a web page data generating device for generating web page data, which represents a web page requested by the received web page request data and that contains the identification data generated by said identification data generating device, based upon the web page request data received by said web page request data receiving device; and
a web page data transmitting device for transmitting the web page data, which has been generated by said web page data generating device, to said client terminal device;

said client terminal device includes:
a web page data receiving device for receiving the web page data transmitted from said web page data transmitting device of said server apparatus; and
a content request identification data transmitting device for associating and transmitting content request data, which requests content at a link destination of a link that has been embedded in a web page represented by the web page data received by said web page data receiving device, and the identification data contained in the web page data received by said web page data receiving device, to said server apparatus; and said server apparatus further includes:
a content request identification data receiving device for receiving the request data and the identification data associated and transmitted from said content request identification data transmitting device of said client terminal device;

an access log recording device for recording content-specifying data, which specifies the content requested by the request data received by said content request identification data receiving device, and identification data received by said content request identification data receiving device; and a content transmitting device for transmitting the content, which has been requested by the content request data received by said content request identification data receiving device, to said client terminal device.

2. The system according to claim 1, further comprising an access-count deciding device for deciding, for content-specifying data recorded by said access log recording device of said server apparatus, that a recorded number of times for which the identification data for a content-specifying data is different is the number of times the content specified by this content-specifying data was accessed.

3. The system according to claim 1, wherein said access log recording device of said server apparatus, in addition to recording content-specifying data, which specifies content requested by the request data received by said content request identification data receiving device, and identification data received by said content request identification data receiving device, records time of receipt of the request data received by said content request identification data receiving device; and
said access-count deciding device of said server apparatus decides the number of times the content was accessed, this decision being rendered by regarding items of content-specifying data for which the times of receipt are separated by more than a fixed period of time among items of content-specifying data for which the identification data is the same, as different items of identification data.

4. The system according to claim 1, wherein in a case where a plurality of links to items of content have been embedded in a web page, said identification data generating device of said server apparatus generates items of identification data, a part of each being common to the plurality of items of content, in correspondence with respective ones of the items of content; and
an access-count deciding device of said server apparatus decides, for content-specifying data recorded by said access log recording device of said server apparatus, that a recorded number of times for which identification data for a content-specifying data is different, is the number of times the content at link destinations of the plurality of links was accessed, or
said access-count deciding device decides that the number of times identification data having a common part has been recorded, is the number of times the content at the link destinations of the plurality of links was accessed.

5. The system according to claim 1, wherein said server apparatus further includes:
an expiration-date data generating device for generating data, which relates to expiration date of identification data, in correspondence with identification data generated by said identification data generating device of said server apparatus; and an expiration-date determination device for determining whether time of receipt of request data and identification data received by said content request identification data receiving device of said server apparatus falls within an expiration date decided based upon the expiration-date data generated by said expiration-date data generating device in correspondence with the identification data received; and said content transmitting device of said server apparatus transmits content requested by the content request data received by said content request identification data receiving device to said client terminal device in response to a determination by said expiration-date determination device that the time of receipt is within the expiration date, and transmits re-access request data, which requests access to the web page, to said client terminal device in response to a determination by said expiration-date determination device that the time of receipt exceeds the expiration date.

6. The system according to claim 5, wherein in a case where expiration-date data that should have been generated in correspondence with identification data does not exist among request data and identification data received by said content request identification data receiving device of said server apparatus, or if such expiration-date data is invalid, then said expiration-date determination device determines that the time of receipt exceeds the expiration date.

7. A server apparatus comprising:
a web page request data receiving device for receiving web page request data that has been transmitted from a client terminal device, the web page request data requesting a web page specified by a URL and having a link to content embedded therein;

an identification data generating device for generating identification data, which identifies the content, based upon receipt of web page request data by said web page request data receiving device;

a web page data generating device for generating web page data, which represents a web page requested by the received web page request data and that contains the identification data generated by said identification data generating device, based upon receipt of the web page data received by said web page request data receiving device;

a web page data transmitting device for transmitting the web page data, which has been generated by said web page data generating device, to the client terminal device;

a content request identification data receiving device for receiving content request data, which requests content at a link destination of a link that has been embedded in a web page represented by received web page data, and identification data associated with the content request data and contained in the web page data received by said web page data receiving device, said content request data and said identification data being transmitted from the client terminal device in response to receipt at the client terminal device of the web page data transmitted from said web page data transmitting device;

an access log recording device for recording content-specifying data, which specifies the content requested by the request data received by said content request identification data receiving device, and identification data received by said content request identification data receiving device; and a content transmitting device for transmitting the content, which has been requested by the content request data received by said content request identification data receiving device, to the client terminal device.

8. A method of controlling a server apparatus comprising:

a step of a web page request data receiving device receiving web page request data that has been transmitted from a client terminal device, the web page request data requesting a web page specified by a URL and having a link to content embedded therein;

a step of an identification data generating device generating identification data, which identifies the content, based upon receipt of web page request data by the web page request data receiving device;

a step of a web page data generating device generating web page data, which represents a web page requested by the received web page request data and that contains the identification data generated by the identification data generating device, based upon receipt of the web page data received by the web page request data receiving device;

a step of a web page data transmitting device transmitting the web page data, which has been generated by the web page data generating device, to the client terminal device;

a step of a content request identification data receiving device receiving content request data, which requests content at a link destination of a link that has been embedded in a web page represented by received web page data, and identification data associated with the content request data and contained in the web page data received by the web page data receiving device, the content request data and the identification data being transmitted from the client terminal device in response to receipt at the client terminal device of the web page data transmitted from web page data transmitting device;

a step of an access log recording device recording content-specifying data, which specifies content requested by the request data received by the content request identification data receiving device, and identification data received by the content request identification data receiving device; and a step of a content transmitting device transmitting the content, which has been requested by the content request data received by the content request identification data receiving device, to the client terminal device.

9. A non-transitory computer readable medium storing a computer program, wherein the program controls a server apparatus so as to:

receive web page request data that has been transmitted from a client terminal device, the web page request data requesting a web page specified by a URL and having a link to content embedded therein;

generate identification data, which identifies the content, based upon receipt of web page request data;

generate web page data, which represents a web page requested by the received web page request data and that contains the identification data generated, based upon receipt of the web page data;

transmit the generated web page data to the client terminal device;

receive content request data, which requests content at a link destination of a link that has been embedded in a web page represented by received web page data, and identification data associated with the content request data and contained in the received web page data, said content request data and said identification data being transmitted from the client terminal device in response to receipt of the web page data transmitted;

record content-specifying data, which specifies the content requested by the received request data, and the received identification data; and transmit the content, which has been requested received by the content request data, to the client terminal device.

* * * * *